(12) United States Patent
Lin et al.

(10) Patent No.: US 7,768,607 B2
(45) Date of Patent: Aug. 3, 2010

(54) TRANSFLECTIVE LIQUID CRYSTAL DISPLAY PANEL AND METHOD FOR MANUFACTURING SUBSTRATE THEREOF

(75) Inventors: Yu-Cheng Lin, Miao-Li (TW); Chun-Yu Wang, Miao-Li (TW); Chueh-Ju Chen, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 155 days.

(21) Appl. No.: 11/879,393

(22) Filed: Jul. 16, 2007

(65) Prior Publication Data

US 2008/0013024 A1    Jan. 17, 2008

(30) Foreign Application Priority Data

Jul. 14, 2006    (TW) ............... 95125817 A

(51) Int. Cl.
*G02F 1/1335* (2006.01)
(52) U.S. Cl. ....................... 349/114; 349/113
(58) Field of Classification Search ............ 349/114
See application file for complete search history.

(56) References Cited

U.S. PATENT DOCUMENTS

| | | | |
|---|---|---|---|
| 6,580,480 B2 | 6/2003 | Baek et al. | |
| 6,806,934 B2 | 10/2004 | Furuhashi et al. | |
| 6,822,708 B2 | 11/2004 | Fujino | |
| 2002/0024047 A1* | 2/2002 | Yamazaki et al. | 257/59 |
| 2004/0233359 A1* | 11/2004 | Nam et al. | 349/114 |

FOREIGN PATENT DOCUMENTS

| | | |
|---|---|---|
| TW | 525020 B | 3/2003 |
| TW | 562960 B | 11/2003 |
| TW | 200521533 A | 7/2005 |
| TW | 200607116 A | 2/2006 |
| TW | 200613826 A | 5/2006 |

\* cited by examiner

*Primary Examiner*—Charlie Peng
*Assistant Examiner*—Erin D Chiem
(74) *Attorney, Agent, or Firm*—Wei Te Chung

(57) ABSTRACT

An exemplary transflective liquid crystal display panel (2) includes a first substrate (21) with a glass base (210), a second substrate (22) opposite to the first substrate, a liquid crystal layer (23) between the first and second substrates, and an insulating layer (211), a first passivation layer (212), a first electrode layer (213), and a second passivation layer (216) successively disposed at an inner side of the glass base. The first electrode layer has an uneven surface (2131), the second passivation layer is provided only at reflective areas of the transflective liquid crystal display panel, the second passivation layer has a reflection characteristic, and the second passivation layer has a plurality of bumps (2161) at an inmost side thereof.

19 Claims, 4 Drawing Sheets

TRANSFLECTIVE LIQUID CRYSTAL DISPLAY PANEL AND METHOD FOR MANUFACTURING SUBSTRATE THEREOF

FIELD OF THE INVENTION

The present invention relates to liquid crystal display (LCD) panels, and more particularly to a transflective LCD panel and a method for manufacturing a substrate of the transflective LCD panel.

BACKGROUND

An LCD device has the advantages of portability, low power consumption, and low radiation, and has been widely used in various portable information products such as notebooks, personal digital assistants (PDAs), video cameras and the like. Conventionally, there have been three types of LCD devices commercially available: a reflective LCD device utilizing ambient light, a transmissive LCD device utilizing backlight, and a transflective LCD device equipped with a half mirror and a backlight.

With a reflective LCD device, a display becomes less visible in a dim environment. In contrast, with a transmissive LCD device, a display becomes hazy in strong ambient light (e.g., outdoor sunlight). In general, a transflective LCD device can be used as both a reflective LCD device and a transmissive LCD device by switching between a reflective mode and a transmissive mode according to the changes in the environment. Therefore the transflective LCD device is not hampered by problems of poor visibility and haziness, or at least these problems are mitigated somewhat.

Referring to FIG. 6, part of a transflective LCD panel of a conventional transflective LCD device is schematically shown. The transflective LCD panel 1 includes a first substrate 11, a second substrate 12 opposite to the first substrate 11, and a liquid crystal layer 13 between the substrates 11, 12. The first substrate 11 includes a glass base 110. An insulating layer 111, a passivation layer 112, a transparent electrode layer 113, an organic layer 114, and a metal layer 116 are disposed on the glass base 110 from bottom to top in that order. The organic layer 114 partially covers the transparent electrode layer 113, and is thus comprised of a plurality of segments (only one shown). Each segment of the organic layer 114 has a plurality of bumps 1141 thereon. The metal layer 116 is disposed on the organic layer 114, and is thus correspondingly comprised of a plurality of segments (only one shown). Each segment of the metal layer 116 functions as a reflective electrode, and has an undulant surface due to the bumps 1141. As shown in FIG. 6, the area covered by the segment of the organic layer 114 of the transparent electrode layer 113 corresponds to one reflective area of the transflective LCD panel 1, and the other area uncovered by the organic layer 114 corresponds to one transmissive area of the transflective LCD panel 1.

Referring to FIG. 7, this is a flow chart summarizing a method for manufacturing the transflective LCD panel 1. The method generally includes the following steps:

step S10, providing the glass base 110;
step S11, successively forming the insulating layer 111, the passivation layer 112, the transparent electrode layer 113, the organic layer 114, and a first photo-resist layer on the glass base 110;
step S12, exposing and developing the first photo-resist layer to form a first photo-resist layer pattern, using a photo mask with a hole pattern;
step S13, etching the organic layer 114 according to the first photo-resist layer pattern to leave exposed areas of the transparent electrode layer 113, and to form the bumps 1141, the exposed areas of the transparent electrode layer 113 corresponding to the transmissive areas of the transflective LCD panel 1;
step S14, removing the first photo-resist layer pattern;
step S15, depositing the metal layer 116 on the organic layer 114, and depositing a second photo-resist layer on the metal layer 116 and the exposed areas of the transparent electrode layer 113;
step S16, exposing and developing the second photo-resist layer to form a second photo-resist layer pattern on the metal layer 116, using another photo mask;
step S17, etching the metal layer 116 according to the second photo-resist layer pattern to form a plurality of reflective electrodes on the organic layer 114, each of the reflective electrodes being undulant;
step S18, removing the second photo-resist layer pattern;
step S19, filling liquid crystal material on the first substrate 11; and
step S110, providing the second substrate 12, and attaching the first and second substrates 11, 12 together to form the transflective LCD panel 1.

In order to form the reflective area of the transflective LCD panel 1, the organic layer 114 must firstly be formed on the transparent electrode layer 113, and then the metal layer 116 must be formed on the organic layer 114 only. Two photo mask processes are required, which makes the whole process of manufacturing the transflective LCD panel 1 rather complicated and costly.

What is needed, therefore, is a transflective LCD panel and a method for manufacturing the transflective LCD panel that can overcome the above-described deficiencies.

SUMMARY

An aspect of the invention relates to a transflective liquid crystal display panel. The transflective liquid crystal display panel includes: a first substrate with a glass base, a second substrate opposite to the first substrate, a liquid crystal layer between the first and second substrates, and an insulating layer, a first passivation layer, a first electrode layer, and a second passivation layer successively disposed at an inner side of the glass base. The first electrode layer has an uneven surface, the second passivation layer is provided only at reflective areas of the transflective liquid crystal display panel, the second passivation layer has a reflection characteristic, and the second passivation layer has a plurality of bumps at an inmost side thereof.

Another aspect of the invention relates to a method for manufacturing a substrate of a transflective liquid crystal display panel. The method includes: successively forming an insulating layer, a first passivation layer and an electrode layer on the glass base; forming an uneven surface of the electrode layer; and forming a second passivation layer on areas of the electrode layer corresponding to reflective areas of the substrate. The second passivation layer has a reflection characteristic, and has a plurality of bumps at a side thereof farthest from the electrode layer due to the uneven surface of the electrode layer.

A further aspect of the invention relates to another method for manufacturing a substrate of a transflective liquid crystal display panel. The method includes: providing a glass base; successively forming an insulating layer, a first electrode layer, a first passivation layer, and a second electrode layer on the glass base; forming an uneven surface on the second electrode layer; and forming a second passivation layer on the second electrode layer. The first and second electrode layers have opposite polarities relative to each other, the second passivation layer has a reflection characteristic, and the second passivation layer has a plurality of bumps at an inmost side thereof due to the uneven surface of the second electrode layer.

Other novel features and advantages will become more apparent from the following detailed description when taken in conjunction with the accompanying drawings. In the drawings, all the views are schematic.

DETAILED DESCRIPTION OF PREFERRED EMBODIMENTS

Figure 1:
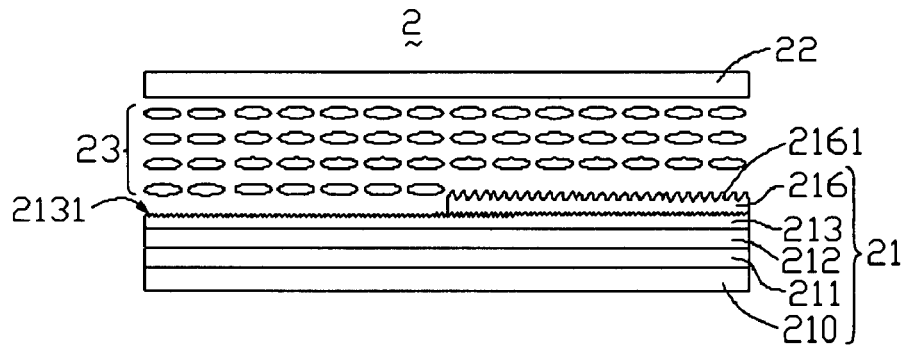
FIG. 1 is a side, cross-sectional view of one pixel area of a transflective LCD panel according to a first embodiment of the present invention.

Referring to FIG. 1, part of a transflective LCD panel according to a first embodiment of the present invention is shown. The transflective LCD panel 2 includes a first substrate 21, a second substrate 22 opposite to the first substrate 21, and a liquid crystal layer 23 between the substrates 21, 22. The first substrate 21 includes a glass base 210. An insulating layer 211, a first passivation layer 212, an electrode layer 213, and a second passivation layer 216 are disposed on the glass base 210 from bottom to top in that order.

The electrode layer 213 can be made of a transparent conductive material such as indium-tin-oxide (ITO) or indium-zinc-oxide (IZO). The second passivation layer 216 can be made of amorphous silicon nitride. The electrode layer 213 has an uneven surface 2131 formed by plasma bombardment. The uneven surface 2131 has randomly formed undulations. A magnitude of the undulations as measured from tops of peaks thereof to bottoms of troughs thereof is in the range from 0 to 100 Å (angstroms). The second passivation layer 216 partially covers the electrode layer 213, and is thus comprised of a plurality of segments (only one shown). Each segment of the second passivation layer 216 has a plurality of bumps 2161 formed thereon. The bumps 2161 have a reflection rate of 30%, and are randomly formed with different shapes and different sizes. The reflection capability of the bumps 2161 is proportional to the sizes of the bumps 2161. As shown in FIG. 1, the area covered by the segment of the second passivation layer 216 corresponds to one reflective area of the transflective LCD panel 2, and the other area uncovered by the second passivation layer 216 corresponds to one transmissive area of the transflective LCD panel 2.

Figure 2:
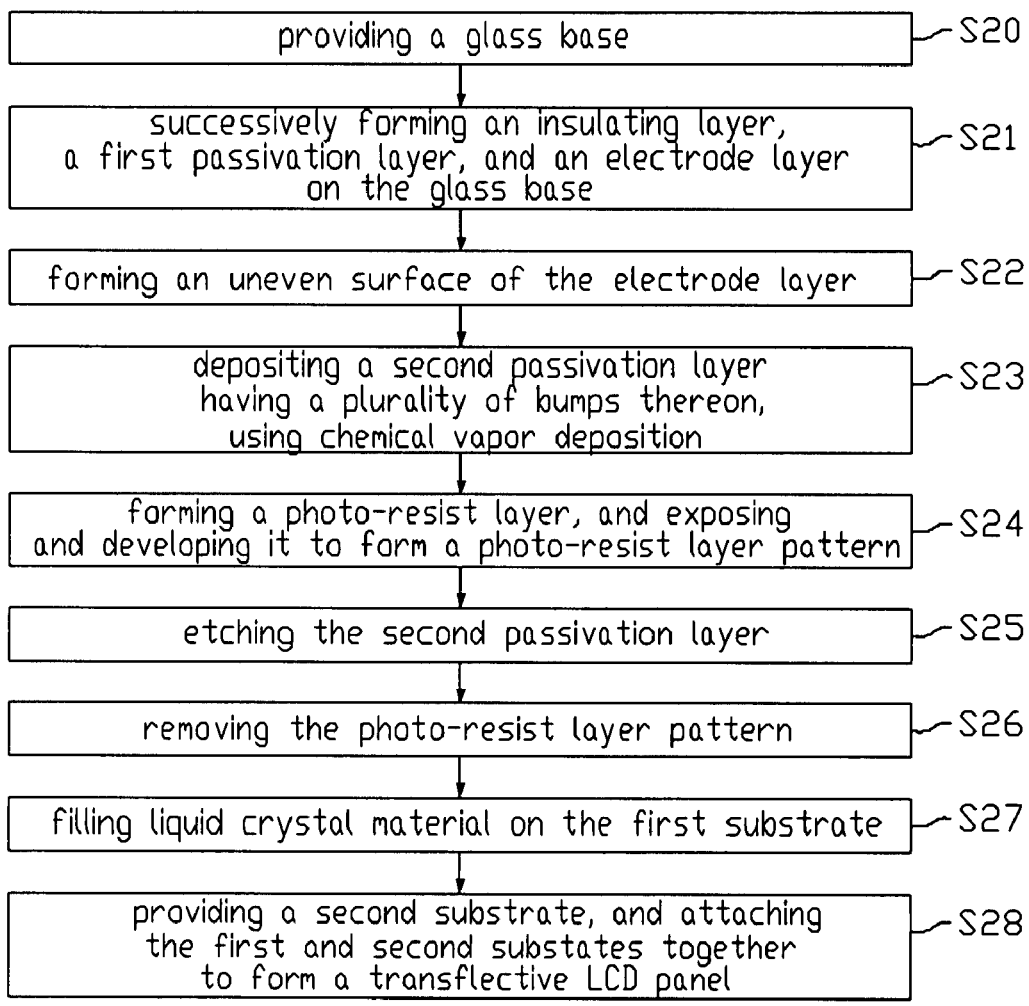
FIG. 2 is a flowchart summarizing an exemplary method for manufacturing the transflective LCD panel of FIG. 1.

Referring to FIG. 2, this is a flow chart summarizing an exemplary method for manufacturing the transflective LCD panel 2. The method includes the following steps:

step S20, providing the glass base 210;

step S21, successively forming the insulating layer 211, the first passivation layer 212, and the electrode layer 213 on the glass base 210;

step S22, forming the uneven surface 2131 of the electrode layer 213 using plasma bombardment, wherein the plasma bombardment can utilize $H_2$ or $N_2$ plasma, and the intensity of the plasma bombardment can be 500 W (watts);

step S23, depositing the second passivation layer 216 made of amorphous silicon nitride on the electrode layer 213 using chemical vapor deposition and forming the plurality of bumps 2161 on the second passivation layer 216, wherein the rate of the deposition can be 34.2 Å/s (angstroms/second), and the bumps 2161 are formed on the surface of the second passivation layer 216 due to the configuration of the uneven surface 2131 of the electrode layer 213;

step S24, forming a photo-resist layer on the second passivation layer 216, and exposing and developing the photo-resist layer to form a photo-resist layer pattern using a photo mask;

step S25, etching the second passivation layer 216 according to the photo-resist layer pattern, thereby defining a plurality of reflective areas (segments of the second passivation layer 216) corresponding to the photo-resist layer pattern;

step S26, removing the photo-resist layer pattern;

step S27, filling liquid crystal material on the first substrate 21; and step S28, providing the second substrate 22, and attaching the first and second substrates 21,22 together to form the transflective LCD panel 2.

The second passivation layer 216, which corresponds to the reflective areas, is made of a substance having reflective characteristics, such as amorphous silicon nitride. The bumps 2161 on the surface of each segment of the second passivation layer 216 add to the reflective characteristics of the second passivation layer 216. Thus the second passivation layer 216 can provide high reflection of incident light. For further improving the high reflection characteristics of the reflective areas, a reflective layer can be formed on the second passivation layer 216. The reflective layer is thus correspondingly comprised of a plurality of segments. The reflective layer can be an inorganic paint film or a metal layer.

In summary, in order to form the reflective and transmissive areas of the transflective LCD panel 2, only the second passivation layer 216 having the bumps 2161 is needed. The segments of the second passivation layer 216 are formed on the electrode layer 213 using only one photo mask process. This makes the process of manufacturing the transflective LCD panel 2 relatively simple and inexpensive.

Figure 3:
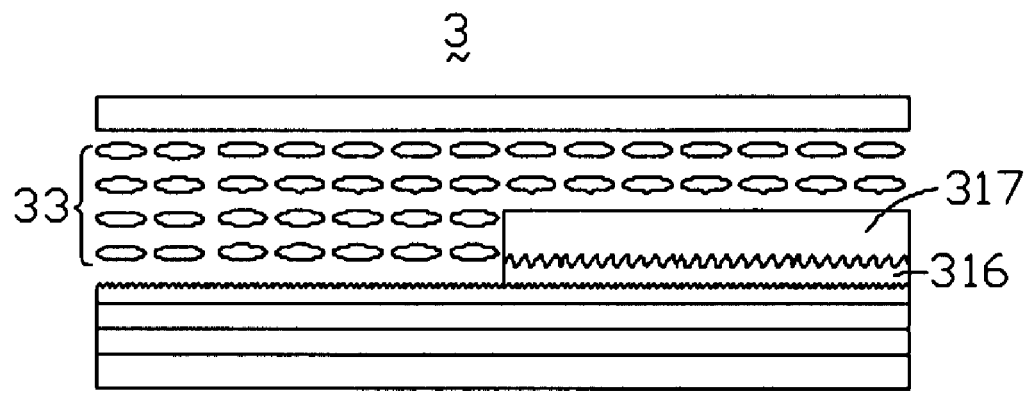
FIG. 3 is a side, cross-sectional view of one pixel area of a transflective LCD panel according to a second embodiment of the present invention.

Referring to FIG. 3, part of a transflective LCD panel according to a second embodiment of the present invention is shown. The transflective LCD panel 3 has a structure similar to that of the transflective LCD panel 2. However, the transflective LCD panel 3 includes an organic layer 317 disposed on a second passivation layer 316, so as to provide a liquid crystal layer 33 with two different so-called "cell gaps". The cell gap at each of the transmissive areas is larger than the cell gap at each of the reflective areas. For example, the cell gap at each of the transmissive areas is twice the cell gap at each of the reflective areas.

Figure 4:
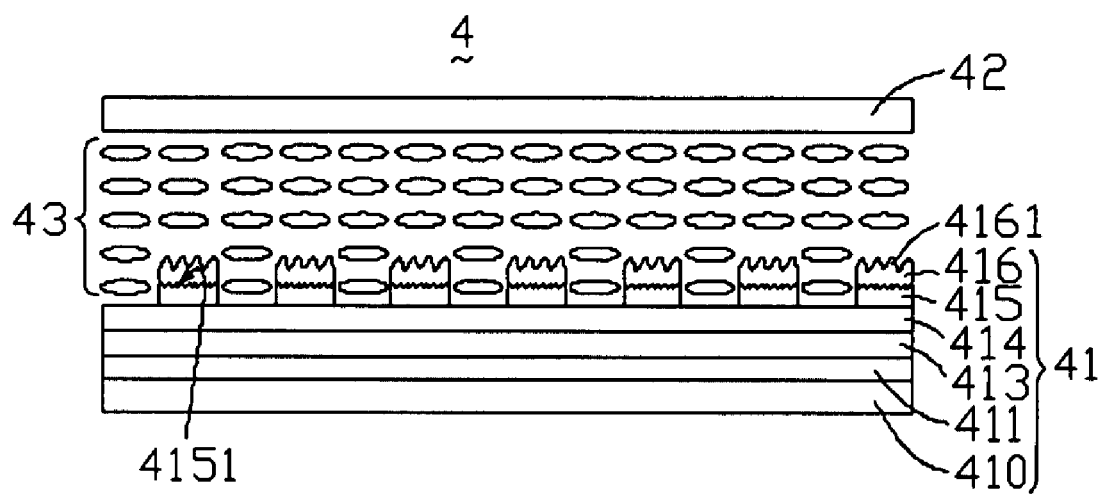
FIG. 4 is a side, cross-sectional view of one pixel area of a transflective LCD panel according to a third embodiment of the present invention.

Referring to FIG. 4, part of a transflective LCD panel according to a third embodiment of the present invention is shown. The transflective LCD panel 4 is typically used in a fringe field switching (FFS) transflective LCD device that has a wide-angle field. The transflective LCD panel 4 includes a first substrate 41, a second substrate 42 opposite to the first substrate 41, and a liquid crystal layer 43 between the substrates 41, 42. The first substrate 41 includes a glass base 410. An insulating layer 411, a first electrode layer 413, a first passivation layer 414, a second electrode layer 415, and a second passivation layer 416 are disposed on the glass base 410 from bottom to top in that order. The first and second electrode layers 413, 415 have opposite polarities relative to each other. The second electrode layer 415 is discontinuously formed. As shown in FIG. 4, each of pixel areas of the transflective LCD panel 4 includes a plurality of segments of the second electrode layer 415. The second passivation layer 416 is disposed on the second electrode layer 415, and is correspondingly discontinuous. That is, each of the pixel areas of the transflective LCD panel 4 includes a plurality of segments of the second passivation layer 416. Thus at each pixel area the second passivation layer 416 and the second electrode layer 415 cooperatively define a plurality of intervals between joint segments thereof.

The first electrode layer 413 can be made of a transparent conductive material such as indium-tin-oxide (ITO) or indium-zinc-oxide (IZO). The second passivation layer 416 can be made of amorphous silicon nitride. As shown in FIG. 4, areas covered by the second electrode layer 415 and the second passivation layer 416 correspond to reflective areas of the transflective LCD panel 4, and other areas not covered by the second electrode layer 415 and the second passivation layer 416 correspond to transmissive areas of the transflective LCD panel 4.

The second electrode layer 415 has an uneven surface 4151 next to the second passivation layer 416. The uneven surface 4151 has randomly formed undulations, which are formed by plasma bombardment. A magnitude of the undulations as measured from tops of peaks thereof to bottoms of troughs thereof is in the range from 0 to 100 Å. The second passivation layer 416 has a plurality of bumps 4161 thereon. The bumps 4161 have a reflection rate of 30%, and are randomly formed with different shapes and different sizes. The reflection capability of the bumps 4161 is proportional to the sizes of bumps 4161.

An exemplary method for manufacturing the transflective LCD panel 4 is similar to the above-described exemplary method for manufacturing the transflective LCD panel 2. However, the first electrode layer 413 is formed after the insulating layer 411 is formed on the glass base 410, and is formed before the first passivation layer 414 is formed. The second electrode layer 415 and the second passivation layer 416 are etched cooperatively to cooperatively form the joint segments thereof. These joint segments function as a plurality of pixel electrodes.

Figure 5:
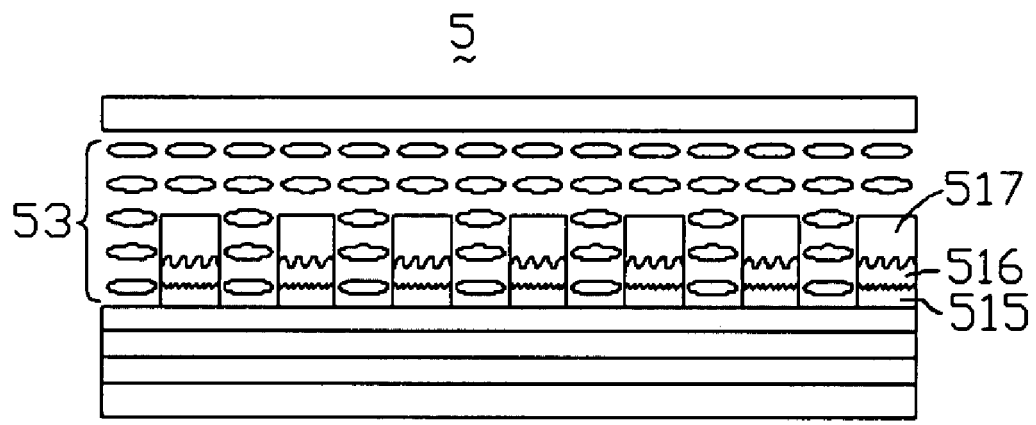
FIG. 5 is a side, cross-sectional view of one pixel area of a transflective LCD panel according to a fourth embodiment of the present invention.
Figure 6:
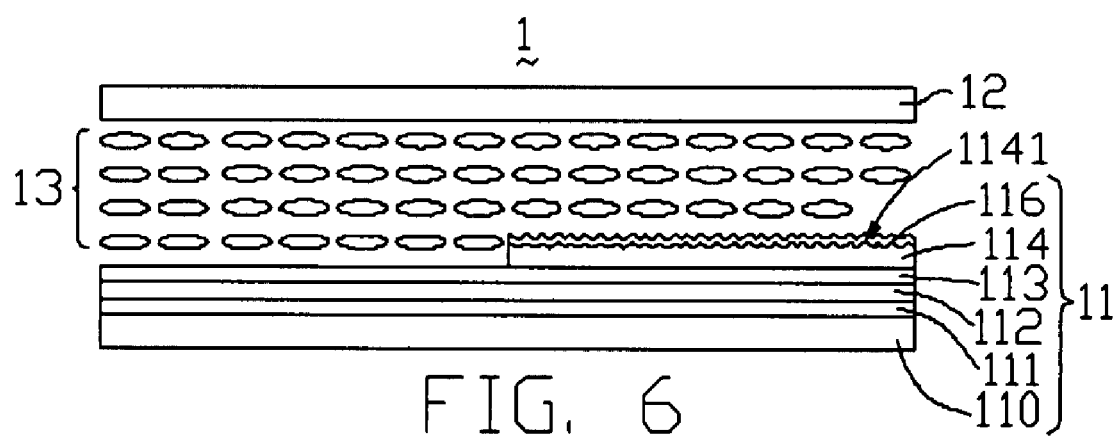
FIG. 6 is a side, cross-sectional view of one pixel area of a conventional transflective LCD panel.
Figure 7:
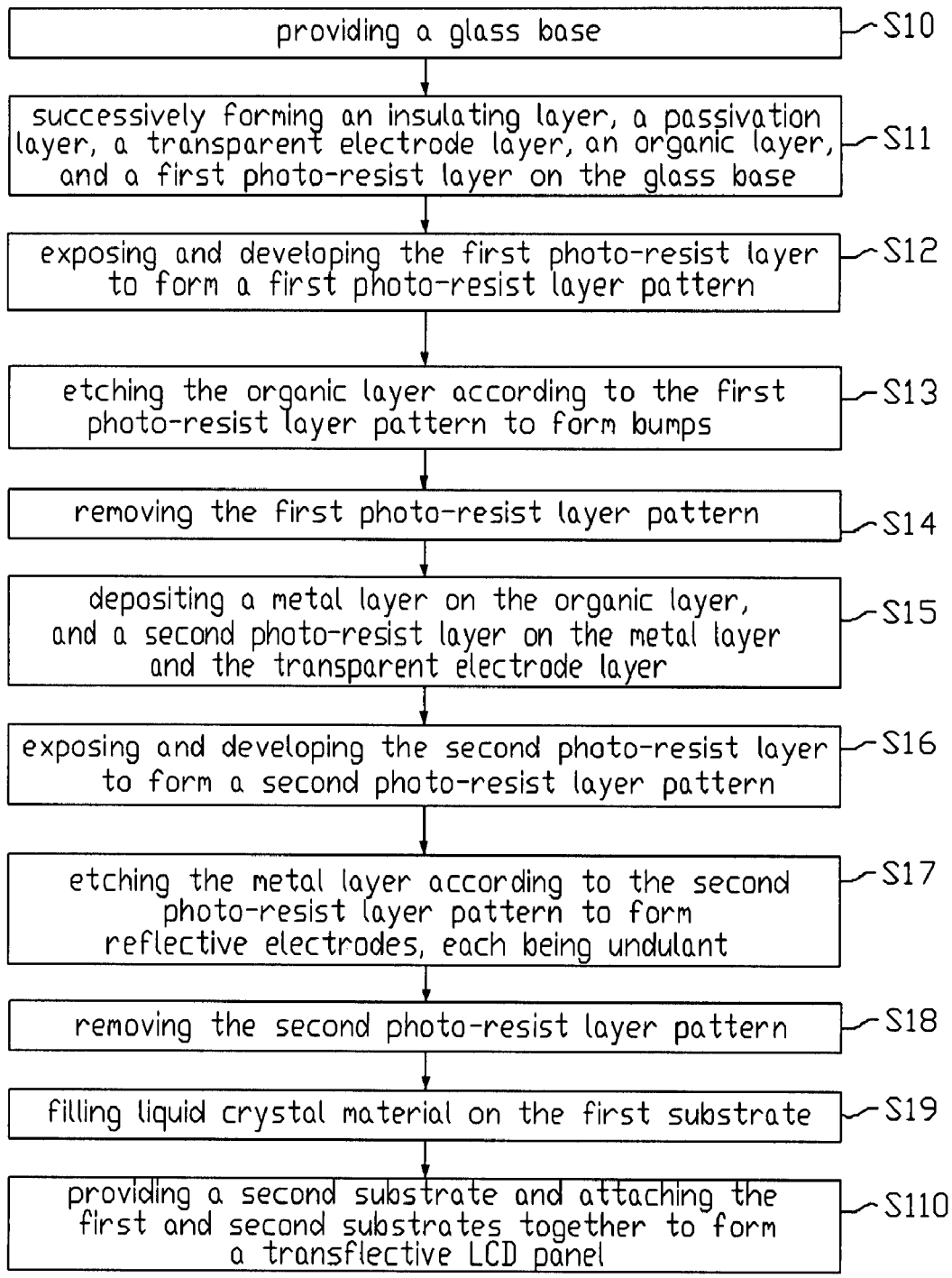
FIG. 7 is a flowchart summarizing a method for manufacturing the transflective LCD panel of FIG. 6.

Referring to FIG. 5, part of a transflective LCD panel according to a fourth embodiment of the present invention is shown. The transflective LCD panel 5 has a structure similar to that of the transflective LCD panel 4. However, the transflective LCD panel 5 includes an organic layer 517 disposed on a second passivation layer 516, so as to provide a liquid crystal layer 53 with two different cell gaps. The cell gap at each of the transmissive areas is larger than the cell gap at each of the reflective areas. For example, the cell gap at each of the transmissive areas is twice the cell gap at each of the reflective areas.

An exemplary method for manufacturing the transflective LCD panel 5 is similar to the above-described exemplary method for manufacturing the transflective LCD panel 4. However, the organic layer 517 is formed after the second passivation layer 516 is formed on a second electrode layer 515. The second electrode layer 515, the second passivation layer 516 and the organic layer 517 are etched cooperatively to cooperatively form joint segments thereof.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A transflective liquid crystal display panel, comprising:
a first substrate with a glass base;
a second substrate opposite to the first substrate;
a liquid crystal layer between the first and second substrates; and
an insulating layer, a first passivation layer, a first electrode layer, and a second passivation layer successively disposed at an inner side of the glass base such that the insulting layer is nearest the glass base and the second passivation layer is farthest from the glass base;
wherein the first electrode layer has an uneven surface, the second passivation layer is provided only at reflective areas of the transflective liquid crystal display panel, the second passivation layer has a reflection characteristic, and the second passivation layer has a plurality of bumps at an inmost side thereof.

2. The transflective liquid crystal display panel as claimed in claim 1, wherein the uneven surface has randomly formed undulations, and a magnitude of the undulations as measured from tops of peaks thereof to bottoms of troughs thereof is in the range from 0 to 100 Å.

3. The transflective liquid crystal display panel as claimed in claim 1, wherein the bumps are randomly formed with different shapes and different sizes.

4. The transflective liquid crystal display panel as claimed in claim 1, wherein the second passivation layer is made of amorphous silicon nitride.

5. The transflective liquid crystal display panel as claimed in claim 1, further comprising a reflective layer disposed on an inmost side of the passivation layer.

6. The transflective liquid crystal display panel as claimed in claim 1, further comprising an organic layer disposed on an inmost side of the second passivation layer.

7. The transflective liquid crystal display panel as claimed in claim 6, wherein the liquid crystal layer has two different cell gaps, one at the organic layer and the other at areas of the transflective liquid crystal display panel not having the second passivation layer.

8. The transflective liquid crystal display panel as claimed in claim 1, further comprising a second electrode layer disposed between the first passivation layer and the glass base.

9. The transflective liquid crystal display panel as claimed in claim 8, wherein the first and second electrode layers have opposite polarities relative to each other.

10. The transflective liquid crystal display panel as claimed in claim 9, wherein the second passivation layer and the first electrode layer cooperatively define a plurality of intervals between joint segments thereof.

11. The transflective liquid crystal display panel as claimed in claim 10, further comprising an organic layer disposed on an inmost side of the second passivation layer.

12. The transflective liquid crystal display panel as claimed in claim 11, wherein the liquid crystal layer has two different cell gaps, one at the organic layer and the other at areas of the transflective liquid crystal display panel not having the second passivation layer.

13. A method for manufacturing a substrate of a transflective liquid crystal display panel, the method comprising:
providing a glass base;
successively forming an insulating layer, a first passivation layer, and an electrode layer, in that order, on the glass base;
forming an uneven surface on the electrode layer by the plasma bombardment; and
forming a second passivation layer on areas of the electrode layer corresponding to reflective areas of the substrate, wherein the second passivation layer has a reflection characteristic, and has a plurality of bumps at a side thereof farthest from the electrode layer due to the uneven surface of the electrode layer.

14. The method as claimed in claim 13, wherein the plasma bombardment utilizes $H_2$ plasma.

15. The method as claimed in claim 13, wherein the plasma bombardment utilizes $N_2$ plasma.

16. The method as claimed in claim 13, wherein the second passivation layer is formed by chemical vapor deposition.

17. The method as claimed in claim 13, further comprising: forming an organic layer on the second passivation layer.

18. A method for manufacturing a substrate of a transflective liquid crystal display panel, the method comprising:
providing a glass base;
successively forming an insulating layer, a first electrode layer, a first passivation layer, and a second electrode layer, in that order, on the glass base;
forming an uneven surface on the second electrode layer by plasma bombardment; and
forming a second passivation layer on the second electrode layer, wherein the first
and second electrode layers have opposite polarities relative to each other, the second passivation layer has a reflection characteristic, and the second passivation layer has a plurality of bumps at an inmost side thereof due to the uneven surface of the second electrode layer.

19. The method as claimed in claim 18, further comprising:
forming an organic layer on the second passivation layer; and
etching the organic layer, the second passivation layer, and the second electrode layer cooperatively.

* * * * *